US008191923B2

(12) United States Patent
Bachmann

(10) Patent No.: US 8,191,923 B2
(45) Date of Patent: Jun. 5, 2012

(54) ELECTRICAL EARTH CONNECTION AND METHOD OF PRODUCING CONTACT AREAS FOR THE ELECTRICAL EARTH CONNECTION

(75) Inventor: Mike Bachmann, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 256 days.

(21) Appl. No.: 12/631,418

(22) Filed: Dec. 4, 2009

(65) Prior Publication Data

US 2010/0184312 A1 Jul. 22, 2010

(30) Foreign Application Priority Data

Jan. 16, 2009 (DE) ........................ 10 2009 004 887

(51) Int. Cl.
*B60R 21/16* (2006.01)
*H01R 4/66* (2006.01)

(52) U.S. Cl. ....................................... 280/728.2; 439/92

(58) Field of Classification Search .................... 29/460, 29/525.02, 525.11; 280/728.1, 728.2, 735; 307/10.1; 411/429, 431; 361/799; 439/92, 439/97
See application file for complete search history.

(56) References Cited

U.S. PATENT DOCUMENTS

| | | | | |
|---|---|---|---|---|
| 4,400,123 | A * | 8/1983 | Dunegan | 411/373 |
| 4,799,842 | A * | 1/1989 | Kreider et al. | 411/171 |
| 4,873,763 | A * | 10/1989 | Volonta et al. | 29/825 |
| 5,207,588 | A * | 5/1993 | Ladouceur et al. | 439/84 |
| 5,333,897 | A * | 8/1994 | Landis et al. | 280/728.2 |
| 5,356,255 | A * | 10/1994 | Takahashi et al. | 411/431 |
| 5,442,133 | A * | 8/1995 | Arnold et al. | 174/51 |
| 6,077,096 | A * | 6/2000 | Moring et al. | 439/92 |
| 6,158,935 | A * | 12/2000 | Schaty | 411/171 |
| 6,362,971 | B1 * | 3/2002 | Skofljanec | 361/752 |
| 6,402,193 | B1 * | 6/2002 | Fleckenstein | 280/731 |
| 6,688,638 | B2 * | 2/2004 | Schutz | 280/728.2 |
| 7,066,039 | B1 | 6/2006 | Orlogi et al. | |
| 7,156,670 | B2 * | 1/2007 | Schaty | 439/92 |
| 2002/0060448 | A1 * | 5/2002 | Skofljanec | 280/735 |
| 2002/0140212 | A1 * | 10/2002 | Hauer | 280/731 |
| 2002/0149918 | A1 | 10/2002 | Koyama | |

FOREIGN PATENT DOCUMENTS

| | | | |
|---|---|---|---|
| DE | 19901357 | C1 | 3/2000 |
| DE | 19937047 | A1 | 2/2001 |
| DE | 10297204 | A1 | 10/2004 |
| DE | 102004060308 | A1 | 6/2006 |
| DE | 60211587 | T2 | 5/2007 |
| WO | 0047451 | A1 | 8/2000 |
| WO | 0196886 | A1 | 12/2001 |

* cited by examiner

*Primary Examiner* — Paul N Dickson
*Assistant Examiner* — Laura Freedman

(57) ABSTRACT

A holder for a controller housing of a central airbag unit is arranged on a central tunnel of the vehicle and fixed using fastening bolts by union nuts. A blank paint-free contact area is created around the fastening bolts by the union nuts being mounted on the fastening screws before a painting process. After a painting process, the union nuts are removed from the screws and the controller housing is mounted on the contact areas and secured by the union nuts.

6 Claims, 3 Drawing Sheets

ELECTRICAL EARTH CONNECTION AND METHOD OF PRODUCING CONTACT AREAS FOR THE ELECTRICAL EARTH CONNECTION

CROSS-REFERENCE TO RELATED APPLICATION

This application claims the priority, under 35 U.S.C. §119, of German application DE 10 2009 004 887.1, filed Jan. 16, 2009; the prior application is herewith incorporated by reference in its entirety.

BACKGROUND OF THE INVENTION

Field of the Invention

The invention relates to an electrical earth connection for a controller housing of a central airbag unit, and to a method for producing contact areas for the earth connection between a holder and the controller housing of the airbag unit.

Electrical earth contact elements are used in a variety of ways in motor vehicles and serve, for example, to electrically connect an airbag controller to the body of a motor vehicle, with the contact areas being, for example, ground such they are blank, in order to provide optimum contact connection.

Non-prosecuted, published German patent application DE 10 2004 060 308 A1 discloses an electrical earth contact element which establishes mechanical contact-connection with the vehicle body via a contact portion with pointed ends, with an electrical connection being connected to the head of the element.

SUMMARY OF THE INVENTION

It is accordingly an object of the invention to provide an electrical earth connection and a method for producing contact areas for the electrical earth connection which overcome the above-mentioned disadvantages of the prior art methods and devices of this general type, which electrical earth connection can be produced in a simple manner and ensures reliable electrical contact-connection to the body of the vehicle.

With the foregoing and other objects in view there is provided, in accordance with the invention an electrical earth connection configuration. The electrical earth connection configuration contains a central tunnel of a frame structure, a holder having union nuts and fastening bolts which protrude upward and a controller housing of a central airbag unit of a motor vehicle. The controller housing is disposed on the central tunnel by the holder, and the controller housing is fastened to the fastening bolts by the union nuts. A first electrical earth connection being joint welds electrically connects the holder to the central tunnel. A second electrical earth connection electrically connects the controller housing of the central airbag unit to the holder. The second electrical earth connection is defined by paint-free blank contact areas on the holder. The paint-free blank contact areas are disposed on the holder around a foot end of the fastening bolts as a support area for the controller housing.

The advantages mainly achieved by the invention are that an electrical earth connection between a holder and a controller housing, which is connected to the holder, of an airbag unit can be achieved in a simple manner. According to the invention, this is achieved in an advantageous and simple manner by the holder having an electrical earth connection to the central tunnel and the controller housing having an electrical earth connection to the holder. The electrical earth connections are formed by a joint weld to the central tunnel and on the holder by a paint-free blank contact area on the holder, which contact area is arranged on the holder around the foot end of the fastening bolt as a support area for the controller housing.

According to a preferred development of the invention, the contact area for the electrical earth connection between the holder and the controller housing has, in particular, an outer contour which corresponds to the end-face outline contour of the union nut. On account of the blank contact area on the holder around the fastening bolt being covered, specifically before a painting process, complicated after-treatment of the contact areas, for example by grinding, is no longer required. Therefore, the electrical earth connection is not established solely by the steel bolts but by the airbag unit or the controller housing being mounted on the blank contact areas of the holder beneath the union nuts. The blank surfaces can be protected by a conversion coating.

Furthermore, the invention makes provision for the fastening bolts to be composed of a steel material and to be compressed at the foot end by the holder which is composed of an aluminum material, and for the projecting threaded portion to receive a union nut. The fastening bolts preferably contain steel press-in bolts, as a result of which the required torque can be reliably achieved. Mechanical and electrical connections are separate.

The invention also makes provision for the holder which is composed of an aluminum material to be connected to the central tunnel which is composed of an aluminum material by a weld or a metal inert gas (MIG) weld, and the welds are arranged on the bent portions of the holder which are directed towards the central tunnel. These joint welds from the holder to the central tunnel between the components which are composed of aluminum material provide several instances of optimum electrical earth connection.

In particular, the blank contact area on the holder is produced by the union nuts first being screwed onto the fastening bolts of the holder in one procedure before a painting process in such a way that a covered paint-free contact area is formed between the holder and the lower surface of the union nut and then, after the painting process, the union nuts being unscrewed from the fastening bolts and the controller housing of the airbag unit being mounted on the paint-free contact area and then the controller housing being fastened to the holder by the union nuts. This provides an effectively functioning electrical earth connection between the lower face of the controller housing, the airbag unit and the paint-free contact area of the holder.

The paint-free contact areas are created in a simple manner without additional outlay by the union nuts being screwed onto the fastening bolts only before the body is painted and the entire vehicle body then being painted. The union nuts are then unscrewed and the controller housing is mounted and secured by the union nuts.

Other features which are considered as characteristic for the invention are set forth in the appended claims.

Although the invention is illustrated and described herein as embodied in an electrical earth connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
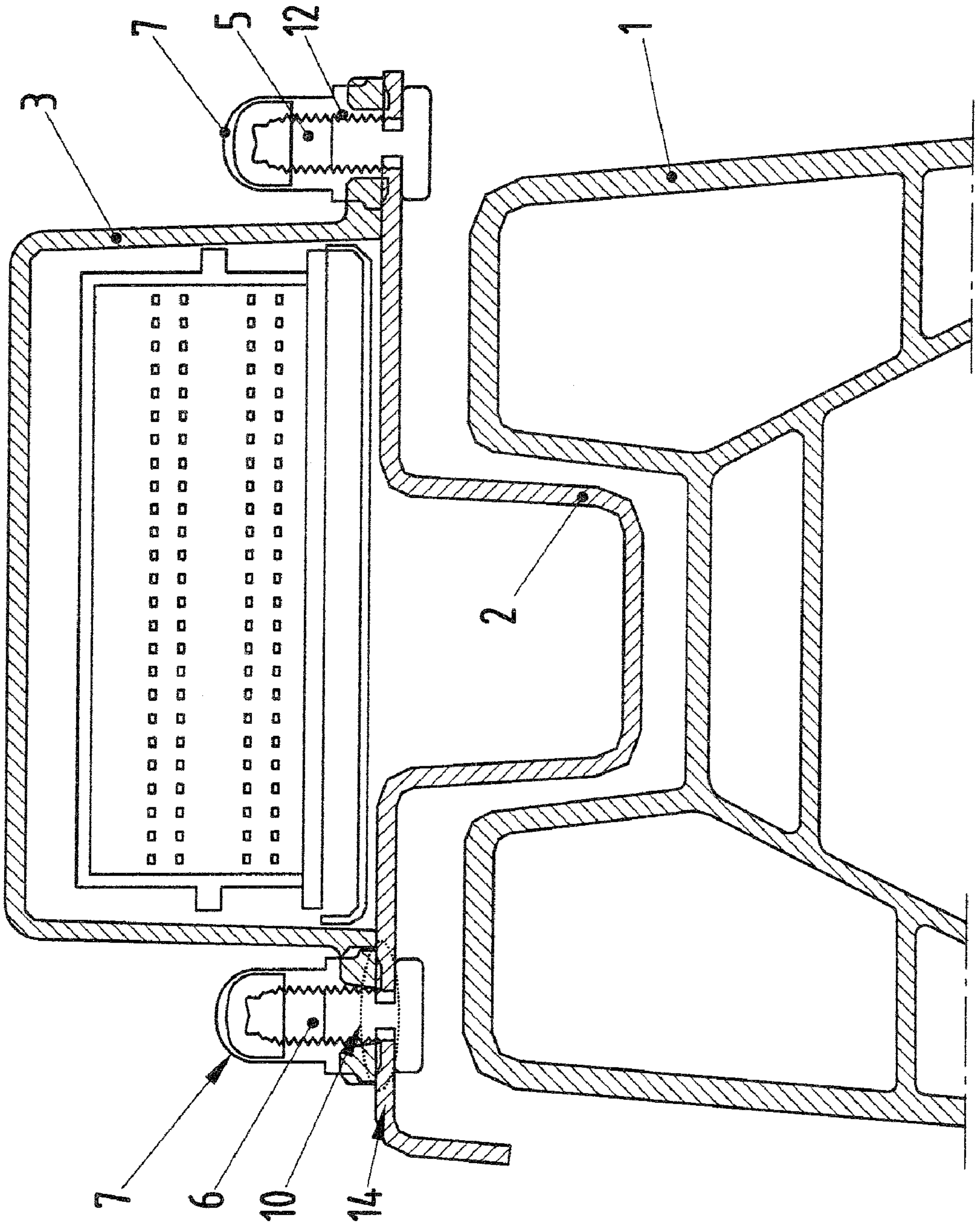
FIG. 1 is a diagrammatic, sectional view through a central tunnel of a vehicle with a holder mounted and a controller housing of an airbag unit fastened to the holder according to the invention.
Figure 2:
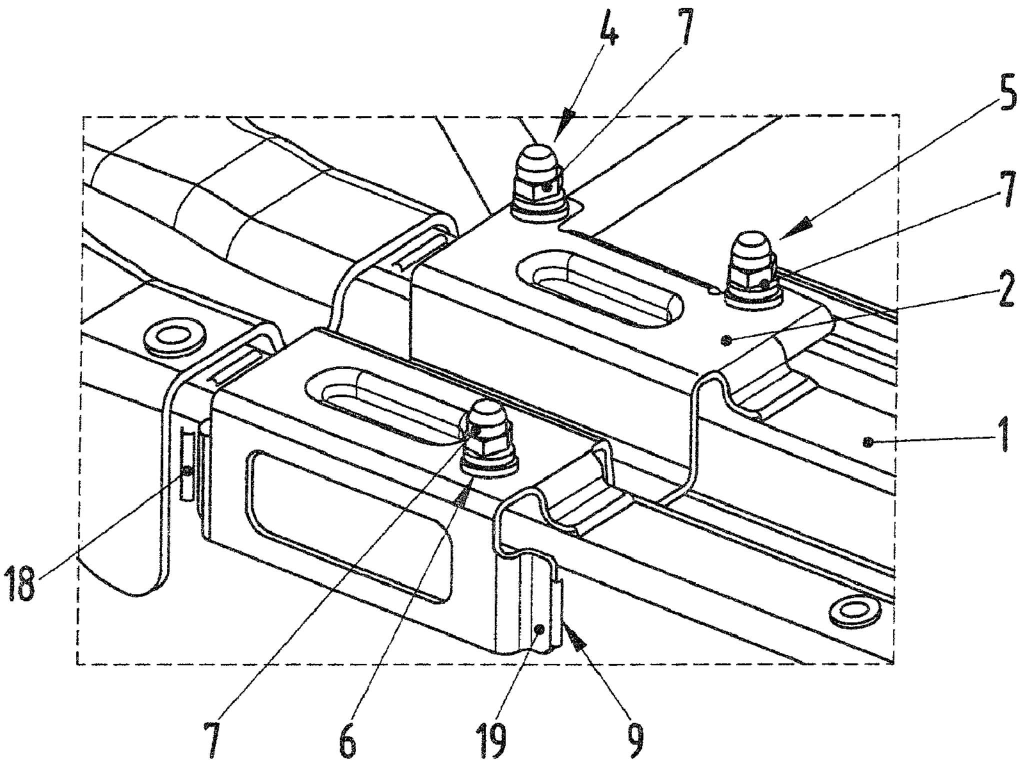
FIG. 2 is a diagrammatic, perspective view of the holder, which is fastened on the central tunnel, for the controller housing.
Figure 3:
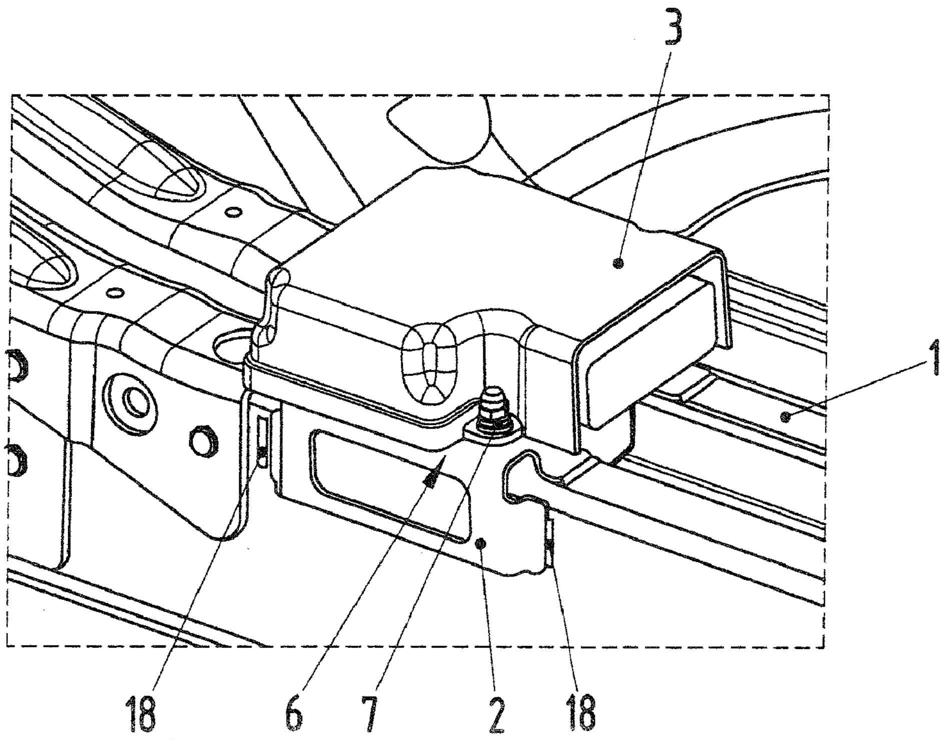
FIG. 3 is a diagrammatic, perspective view of the controller housing which is fastened to the holder.

Referring now to the figures of the drawing in detail and first, particularly, to FIG. 1 thereof, there is shown a central tunnel 1 of a motor vehicle with a holder 2 for a controller housing 3 arranged on it and the controller housing is arranged in a central airbag unit. The holder 2 is welded to the central tunnel 1 and the controller housing 3 is connected to the holder 2 by fastening bolts 4, 5 and 6 on the holder 2. Fixing is provided by union nuts 7 which are screwed onto the fastening bolts 4, 5 and 6.

The controller housing 3 is connected to the body of the vehicle by electrical earth connections 9, 10, with, to this end, the holder 2 being connected to the central tunnel 1 by welds 18 and the controller housing 3 is connected in a bearing manner to the holder 2 by electrically conductive contact areas 14.

Figure 4:
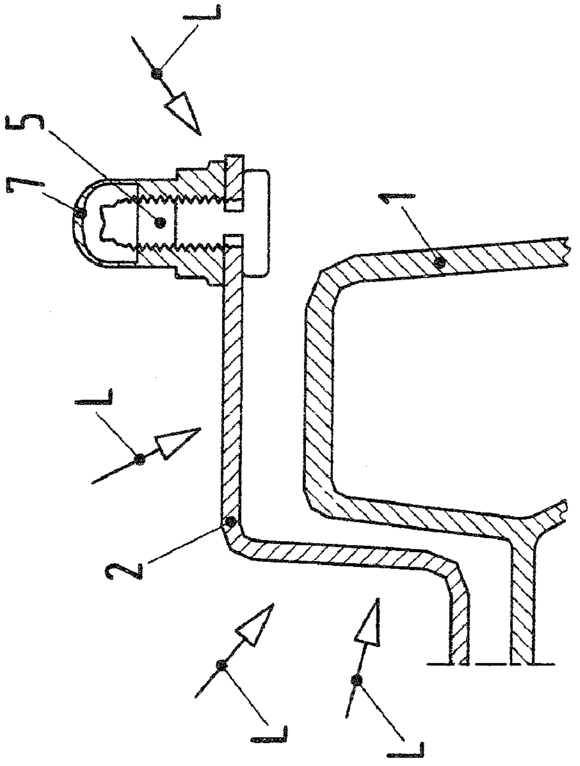
FIG. 4 is a sectional view for illustrating a first method step, in which the union nuts are mounted on the fastening screws and a painting process is then carried out.

The contact areas 14 for the electrical earth connection 10 between the holder 2 and the controller housing 3 are produced by the union nuts 7 being screwed onto the fastening bolts 4, 5 and 6 of the holder 2 before a painting process L—which is indicated by arrows in FIG. 4—, so that a contact area 14 on the holder 2 which corresponds in size to the end-face outer contour of the union nuts 7 is covered.

After the painting process L, the union nuts 7 are unscrewed from the fastening bolts 4, 5 and 6 and this therefore produces a blank surface region which is free of paint and corresponds to the end-face outer contour of the union nuts 7.

The controller housing 3 is then mounted on the fastening bolts 4, 5 and 6 and fastened by the union nuts 7, and therefore the contact areas of the controller housing 3 lie in an electrically conductive manner against the contact areas 14 on the holder 2.

The holder 2, like the central tunnel 1, is likewise composed of an aluminum material and the two components are connected to one another by welds 18 on bent portions 19 which establish the earth connection 11 between the holder 2 and the central tunnel 1.

The fastening bolts 4, 5 and 6 are composed of a steel material and are fastened in a compressed manner at the foot end in the holder 2 which is composed of an aluminum material, and have a projecting threaded portion 12 which receives the union nuts 7.

Figure 6:
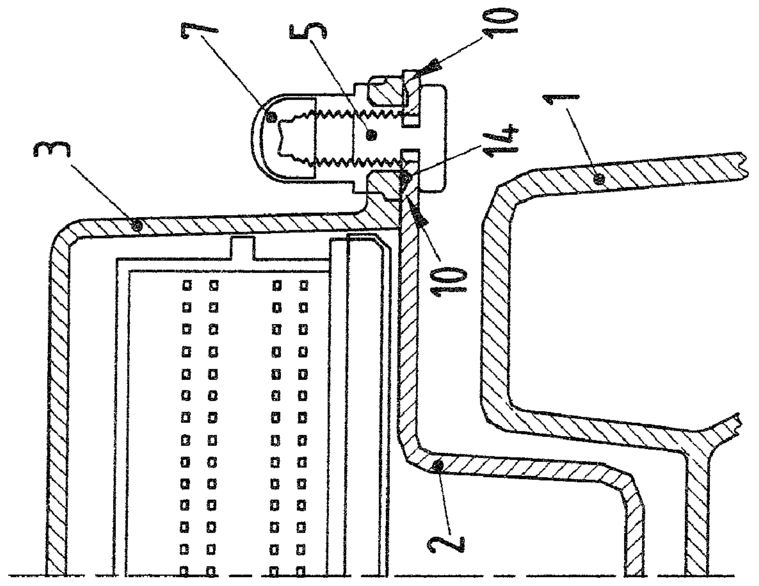
FIG. 6 is a sectional view of the holder with the controller housing mounted.
Figure 5:
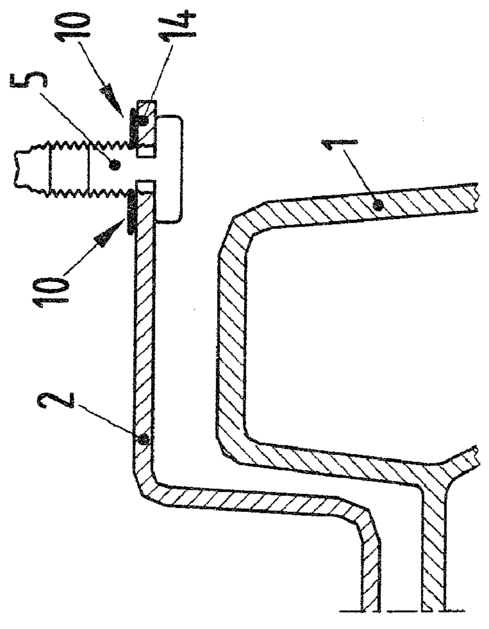
FIG. 5 is a sectional view for illustrating a second method step, in which the union nuts are removed from the screw and the contact areas are exposed.

The individual steps for creating the blank and paint-free contact area 14 on the holder as an electrical earth connection 10, by way of example on the screw 5, are illustrated in FIGS. 4, 5 and 6. In FIG. 4, the union nut 7 is screwed onto the fastening screw 5 before a painting process L and the future contact area 14 is covered in a sealed manner by the end face of the union nut 7. After the vehicle body is painted, the union nut 7 is removed from the fastening screw 5 and the contact area 14 is arranged around the fastening bolt 5. The controller housing 3 is then mounted on the fastening bolts 4, 5 and 6 and secured by the union nuts 7. It goes without saying that areas of the controller housing 3 which are opposite the contact areas 14 likewise have a blank and paint-free surface.

The invention claimed is:

1. An electrical earth connection configuration, comprising:
- a central tunnel of a frame structure;
- a holder having union nuts and fastening bolts which protrude upward;
- a controller housing of a central airbag unit of a motor vehicle, said controller housing disposed on said central tunnel by said holder, and said controller housing being fastened to said fastening bolts by said union nuts;
- a first electrical earth connection being joint welds electrically connecting said holder to said central tunnel; and
- a second electrical earth connection electrically connecting said controller housing of the central airbag unit to said holder, said second electrical earth connection being defined by paint-free blank contact areas on said holder, said paint-free blank contact areas are disposed on said holder around a foot end of said fastening bolts as a support area for said controller housing.

2. The electrical earth connection configuration according to claim 1, wherein said fastening bolts are composed of a steel material and are compressed at said foot end by said holder which is composed of an aluminum material, and said fastening bolts having a projecting threaded portion for receiving said union nuts.

3. The electrical earth connection configuration according to claim 1, wherein:
- said holder has bent portions and is composed of an aluminum material;
- said central tunnel is composed of an aluminum material; and
- said holder is connected to said central tunnel by said welds, said welds are disposed on said bent portions of said holder which are directed towards said central tunnel.

4. The electrical earth connection configuration according to claim 3, wherein said weld is a metal inert gas weld.

5. The electrical earth connection configuration according to claim 1, wherein said paint-free blank contact areas defining said second electrical earth connection between said holder and said controller housing of the airbag unit each have an outer contour corresponding to an end-face outline contour of said union nuts.

6. The electrical earth connection configuration according to claim 1, wherein an electrical earth connection is established from said controller housing, via said contact areas on said holder, via said welds, via said central tunnel, to a vehicle body.

* * * * *